United States Patent Office 3,479,409
Patented Nov. 18, 1969

3,479,409
PROCESS FOR THE CHLORINATION OF
AROMATIC COMPOUNDS
Walter L. Hall, Schenectady, N.Y., assignor to General
Electric Company, a corporation of New York
No Drawing. Filed Feb. 1, 1967, Ser. No. 613,130
Int. Cl. C07c 43/20, 39/24
U.S. Cl. 260—612  5 Claims

ABSTRACT OF THE DISCLOSURE

This disclosure is concerned with a process of chlorinating an aromatic compound, such as aromatic ethers and phenols, whereby the chlorine is added to the activated aromatic ring by the reaction of the aromatic compound with chlorine containing compound of the class of phosgene or thionyl chloride and an aryl sulfoxide. The process described in this disclosure also produces the aryl sulfide as a by-product of the chlorination reaction. The aryl ethers which are chlorinated include both mono-aryl ethers and polyaryl ethers. The chlorinated aromatic ethers and phenols have a wide variety of uses such as solvents for chemical reaction, plasticizers, lubricants, etc.

A number of methods for chlorinating aromatic compounds are known in the art. For example, one can chlorinate aromatic compounds by the reaction of chlorine with the aromatic compound in the presence of a ferric chloride as a catalyst. The processes of the prior art had the disadvantage in that there was relatively little specificity of the reaction; that is, chlorination could take place in the benzene ring and could be greater than mono-chlorination or it could take place in the aryl or alkyl side groups.

It is an object of this invention to set forth a process wherein aromatic ethers and phenols can be chlorinated in the backbone benzene ring without substantially chlorinating any other groups in the molecule.

In accordance with the process of this invention, an admixture of an aryl sulfoxide of the formula I
$$\underset{Ar-S-Ar}{\overset{O}{\|}}$$

wherein Ar is an aromatic group, and an aromatic phenol of the formula

II 

wherein R is an alkyl or aryl group and y is an integer of from 1 to 4, or an aromatic ether is formed in a reaction vessel and then phosgene or thionyl chloride is added to this admixture and then maintaining the temperature at a point where the phosgene or thionyl chloride effects chlorination of the phenol or aryl ether because of the presence of the aryl sulfoxide of Formula I to produce a chlorinated phenol or a chlorinated aryl ether.

The temperature at which the process of the instant invention is conducted is not narrowly critical and can range from 0° C. to 150° C. or even higher. Inasmuch as the reaction of the instant process is exothermic, it is preferred that the initial temperature of the reaction be between 0 to 25° for ease in control of the reaction conditions.

The process of this invention can be conducted at atmospheric pressure, sub-atmospheric pressures or super-atmospheric pressures. For simplicity of equipment and ease of reaction, it is preferred to conduct the process of this invention at atmospheric pressure.

A solvent is not necessarily employed in the process of this invention. However, a solvent can be employed if desired. Inasmuch as the process of this invention is exothermic, it is sometimes desirable to employ a solvent to aid in the dissipation of the heat of reaction. Solvents which can be employed in the process of this reaction include the chlorinated solvents, such as chloroform, carbon tetrachloride, tetrachloroethylene, perchloroethane and the like; aromatic solvents such as benzene, toluene, and the like. The aromatic ethers or phenols can also be employed in large excesses to act as solvents for the process.

The ratio of reactants employed in the process of this invention are not narrowly critical and can range from 0.1 to 1.0 mole of the diarylsulfoxide to 1.0 equivalent of the aromatic ether or phenol and from 0.1 to 10 moles of the thionyl chloride or phosgene per mole of the diarylsulfoxide. For ease of reaction, completeness of reaction and ease of recovery of the reaction products, it is preferred to employ 1.0 mole of the diarylsulfoxide for each equivalent of the aromatic ether or phenol and at least 1.0 mole of phosgene or thionyl chloride and advantageously a slight excess, for example, 1.5 to 2 moles of the latter per mole of the diarylsulfoxide. By the term "equivalent of aromatic ether or phenol" as used herein and which is hereinafter more thoroughly explained, it is meant molar quantities of the monomeric ethers and the phenols, and in the polymeric aromatic ethers, it is meant each mer-unit in the backbone chain of the polyaromatic ether.

It has been found that even by the use of great excess of the phosgene or thionyl chloride and arylsulfoxides, it has not been possible to obtain chlorinated products which contain more than one chlorine per activated benzene ring.

It has been found that the process of this invention yields phenols and aromatic ethers which contain a single chlorine in the benzene ring of the backbone, i.e., the benzene ring which is attached to the hydroxyl group in the phenol or to the ethereal oxygen of the aromatic ether.

For example, when polyaromatic ethers such as poly-(2,6-diphenyl-1,4-phenyleneoxide),

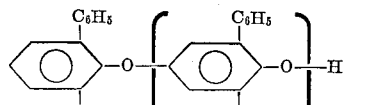

Poly(2,6-dimethyl-1,4-phenyleneoxide)

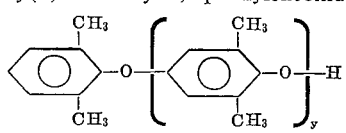

Poly(2-methyl-6-phenyl-1,4-phenyleneoxide)

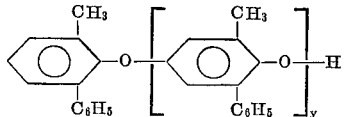

where $y$ is an integer of from 1 to 10,000 or even higher, are reacted in accordance with the process of this invention, the chlorination takes place in the backbone benzene ring and not in the alkyl or phenyl groups in the 2- or 6-positions on such polyaromatic ethers.

The diarylsulfoxides of Formula I which are employed in the process of the invention include, for example, diphenylsulfoxide, bis(4-chlorophenyl)sulfoxide, bis(4-methylphenyl)sulfoxide, phenyl-4-chlorophenylsulfoxide, phenyl-4 - methylphenylsulfoxide, naphthylphenylsulfoxide, and bis(4-bromophenyl)sulfoxide.

The phenols included in Formula II are, for example, phenols, alkylphenols, e.g., methylphenol, dimethylphenol, ethylphenol, octylphenol, etc.; arylphenols, e.g., phenylphenol, tolyphenol, xylylphenol, etc.; alkoxyphenols, such as methoxyphenol, ethoxyphenol, dimethoxyphenol, trimethoxyphenol, dimethyldimethoxyphenol, phenoxyphenol, etc.

The aromatic ethers which can be employed in the process of this invention are for example, the non-polymeric aryl ethers of the formula III 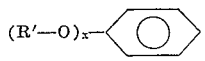

wherein $R'$ is an alkyl group of from 1 to 8 carbon atoms or an aryl group and $x$ is an integer of from 1 to 5. Thus, for example, Formula III includes the alkoxy aryl ethers such as 1,3-dimethoxybenzene, anisole, ethoxybenzene, propoxybenzene, dipropoxybenzene, dioctyloxybenzene, trimethoxybenzene, the diaryl ethers, for example, diphenyl ether, and the like. Also included in the aromatic ethers which can be chlorinated in accordance with the process of this invention are the polyaromatic ethers of Formula IV composed of recurring units of the formula IV 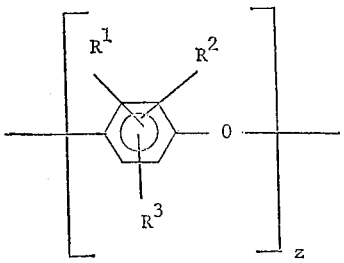

wherein $R^1$, $R^2$ and $R^3$ are members of the class consisting of hydrogen, alkyl groups and aryl groups and $z$ is an integer greater than 1 and prefrably from 5 to 10,000 or even higher. These polyphenylene oxide aryl ethers are more fully disclosed and claimed in application Ser. No. 212,128—Hay, assigned to the assignee of the present invention, which application is made a part hereof by reference thereto. These polyaromatic ethers are for example, poly(2,6-dimethylphenylene-1,4-oxide), poly(2,6-diphenyl-1,4-phenylene oxide), poly (2-methyl-6-phenylphenylene oxide), poly-1,3-phenylene oxide, etc.

The lower molecular weight chlorinated aromatic ethers produced in accordance with this invention find utility as solvents for chemical reactions, etc. The polyaryl ethers which are chlorinated in accordance with the process of this invention, find utility as lubricants, and because of their excellent physical, mechanical, chemical, electrical and thermal properties, the polymers chlorinated in accordance with the process of this invention have many and varied uses. For example, they can be used in molding powder formulations, either alone or mixed with other polymers and may contain various fillers, such as wood flour, diatomaceous earth, carbon black, silica, etc., to make molded parts, such as spur, helical, worm or bevel gears, ratchets, bearings, cams, high impact parts, gaskets, valve seats for high pressure oil and gas systems. They can be used to prepare molded, calendered or extruded articles, films, coatings, threads, filaments, tapes, and the like. They can be applied to a broad spectrum of uses in the form of sheets, rods, tapes, etc. and are useful in electrical applications, such as in cable terminals, terminal blocks, backing for electrical circuits, as components of dynamoelectric machines that opeerate at high temperatures, etc. Films of these materials can be prepared by suitable means, such as, by dissolving or suspending them in a suitable solvent, followed by spreading on a surface from which the polymer is removed after evaporation of the solvent, by calendering or extrusion, etc. These films are useful as metal or metal-fiber lines, containers, covers, closures, electrical insulating tapes, as sound recording tapes, magnetic tapes, photographic films, pipe and wire tapes, etc. As a coating material they can be applied as a solution or suspension to any convenient foundation where a surface possessing their excellent properties is desired. They can be used as an encapsulation material, for electrical insulation, for example, as a wire enamel, potting compound, etc. They can be extruded from melt, solution or suspension into a precipitating solvent or evaporating medium, etc. The fibers so produced (oriented or not) can be woven into fabrics useful in many applications, for example, as filter cloths where high chemical and heat resistance is desired. Their excellent electrical properties make laminates of this material useful for electrical equipment, such as slot wedges in the armature of an electrical motor, panel boards for printed circuits, electrical appliance panels, radio and television panels, small punched electrical pieces, transformer terminal boards, transformer coil spacers, etc. The polymers may also be mixed with various fillers, modifying agents, etc., such as dyes, pigments, stabilizers, plasticizers, etc.

The following examples serve to further illustrate the invention. All parts are, by weight, unless otherwise set forth.

Example 1

Phosgene was bubbled slowly into a solution of diphenylsulfoxide (20.2 grams, 0.1 mole) in anisole (108 grams, 1.0 mole). The temperature increased from 17° to 30° during the first five minutes. During the next ten minutes, the temperature of the system increased spontaneously to 50° C. and the increase in temperature was accompanied by rapid gas evolution. The phosgene addition was stopped and the reaction mixture allowed to stand for an additional 45 minutes. The reaction mixture was then poured into 150 ml. of water with stirring. The water mixture was neutralized with sodium bicarbonate and extracted with diethyl ether. The diethyl ether extract was dried and distilled yielding two fractions, the first boiling between 65° C. and 75° C. at 9 to 10 mm. of mercury and the second at 132° C. to 133° C. at 6 mm. of mercury. The first fraction was identified as monochloroanisole (where the chlorine was on the phenyl nucleus and amounted to 10.2 grams (0.0772 mole)). The second fraction weighed 13.3 grams and was identified as diphenylsulfide (0.071 mole).

Example 2

Phosgene was bubbled slowly into a solution of bis-(4-chlorophenyl)sulfoxide (27.1 grams, 0.1 mole) in anisole (108 grams, 1.0 mole), over a 30-minute period. During the phosgene addition the temperature rose to 44° C. and a rapid evolution of gas accompanied the temperature increase. The reaction mixture was then allowed to cool to 23° C. over a two hour period. The reaction mixture was then poured into 200 ml. of ice water and the water mixture neutralized with sodium bicarbonate and extracted with diethyl ether. The ether extract was dried over sodium sulphate and the ether then removed by evaporation. A white crystalline product (19 grams) was isolated and was identified as bis(4-chlorophenyl) sulfide having a melting point of 92° C. and which represented a 75% of theory yield. Monochloroanisole was also produced by this reaction.

Example 3

Phosgene was bubbled slowly into a solution of 23 grams of bis(4-methylphenyl)sulfoxide (0.1 mole) in 108 grams of anisole (1.0 mole), over a 30-minute period. During the phosgene addition, the temperature rose to 51° C. and gas was rapidly evolved. The reaction mixture was then allowed to stand for an additional 1½ hours and was then added to 150 ml. of water. The water mixture was then neutralized with sodium bicarbonate and extracted with diethyl ether. The ether extract was dried over sodium sulphate and the ether evaporated. The residue was distilled to yield 10 grams of monochloroanisole and 14.7 grams of bis(4-methylphenyl)sulfide (0.069 mole) having a melting point of 53°–55° C.

Example 4

Four chlorinations of polyphenylene oxide were run under the following conditions:

Phosgene was bubbled into a solution containing 10 grams of poly(2,6-dimethyl-1,4-phenylene oxide) (0.083 mole of repeating units) of intrinsic viscosity 0.54 and varying amounts of diphenylsulfoxide as shown in the following table dissolved in 120 ml. of chloroform over a period of 20 minutes. During the phosgene addition the temperature of the system rose to approximately 35° C. Ten minutes after the phosgene addition was stopped, the reaction mixture was added to approximately 150 ml. of a methanol saturated hexane solution. A solid polymer separated which was washed several times with methanol and vacuum dried overnight. The solid polymer was analyzed and found to contain chlorine. The results of these analyses together with other data from the reactions are given in the following table.

A fifth run shown in the following table was made employing a ratio of 2 moles of the sulfoxide to 1 mole of the polyphenylene oxide and in which 20 ml. of chloroform was used as the solvent. The results are given in the table as E.

| Reaction | Sulfoxide gram-mole | Polyphenylene oxide, gram-mole | Percent Cl in product | Percent yield |
|---|---|---|---|---|
| A | 0.025 | 0.083 | 8.0 | 95.9 |
| B | 0.010 | 0.083 | 3.3 | 97.8 |
| C | 0.005 | 0.083 | 1.6 | 96.5 |
| D | 0.081 | 0.083 | [1] 23.1 | 97.8 |
| E | 0.040 | 0.020 | [1] 22.4 | |

[1] Theoretical for 1 chlorine per repeating unit is 22.9% chlorine.

From the table, it can be seen that the chlorination by my process of polyphenylene oxide involves placing one chlorine in the benzene ring in each repeating unit; when one chlorine is inserted in the unit, evidently the benzene ring is deactivated towards further chlorination. This was confirmed by nuclear magnetic resonance analysis of the polymer.

Example 5

Poly(2,6-dimethyl-1,4-phenylene oxide) (10 grams, 0.083 mole repeating units) was dissolved in 120 ml. of chloroform along with 16.6 grams of diphenylsulfoxide (0.083 mole). Thionyl chloride (11.9 grams, 0.1 mole) was added dropwise over a period of 13 minutes. During the addition of the thionyl chloride, the temperature of the reaction mixture increased from 23° C. to 30° C. and gas was evolved. The reaction mixture was allowed to stand for an additional 37 minutes and was quenched by pouring it into methanol. A white polymer precipitated on addition of the reaction mixture to the methanol. The polymer was washed thoroughly with methanol and vacuum dried. The dried polymer (12.25 grams) was dissolved in benzene and reprecipitated in methanol. The polymer was then again washed with methanol and vacuum dried. The polymer was analyzed and was shown to contain 20.9% chlorine and was found to be the corresponding chlorinated polyphenylene oxide containing one chlorine per repeating unit.

Example 6

Phosgene was bubbled into a solution of poly(2-methyl-6-phenyl-1,4-phenylene oxide) (3.64 grams, 0.02 mole repeating units) and diphenylsulfoxide (8.1 grams, 0.04 mole) in 30 ml. of chloroform over a 20-minute period. During the addition, the temperature of the reaction mixture increased from 20° C. to 44° C. The reaction was then quenched by addition of the reaction mixture to methanolic-hexane. A solid polymeric product precipitated from the methanol-hexane mixture and was washed several times with methanol and vacuum dried overnight. The dried polymer was identified as chlorinated poly-(2-methyl-6-phenyl-1,4-phenylene oxide) and contained 15.3% chlorine which represents 95% of the theoretical chlorination of the polymer if approximately one chlorine atom is introduced per repeating unit.

Example 7

Phosgene was bubbled into a solution of 2.4 grams of poly(2,6-diphenyl-1,4-phenylene oxide) (0.01 mole repeating units) and 8.1 grams of diphenylsulfoxide (0.04 mole) in 30 ml. of chloroform over a 20-minute period. Five minutes after the phosgene addition was stopped, the reaction mixture was added to 100 ml. of a methanol-saturated hexane. A solid polymer separated which was washed several times with methanol and vacuum dried overnight. The polymer weighed 2.7 grams and analyzed as containing 7.3% chlorine.

Example 8

Thionyl chloride (23.8 grams) was added to a stirred solution of diphenylsulfoxide (10 grams, 0.05 mole) in 1,3-dimethoxybenzene (50 ml.) at room temperature over a one half hour period. The reaction mixture was then allowed to stand for 2 hours and was then added to 100 ml. of ice water. The aqueous system was extracted with diethyl ether and the ether extract dried over anhydrous sodium sulphate. The ether was distilled off at reduced pressure leaving a residue which was distilled under reduced pressure to yield diphenylsulfide (5.2 grams, 56% yield) boiling point 145°–148° C. at 14 mm. and monochloro-1,3-dimethoxybenzene where the chlorine was on the benzene nucleus.

Example 9

Thionyl chloride (16.5 grams, 0.14 mole) was added over a 5-minute period to a solution of 27.1 grams of bis-(4-chlorophenyl)sulfoxide in 54 grams of anisole. The reaction continued over a 45-minute period during which the temperature reached a maximum of 44° C. and was accompanied by an increase in the rate of gas evolution. The reaction mixture was then added to 200 ml. of ice water. The water mixture was neutralized with sodium bicarbonate and extracted with diethyl ether. The diethyl ether extract was dried over anhydrous sodium sulphate and the ether removed under reduced pressure. From the residue, there was recovered a white crystalline material which was identified as bis(4-chlorophenylsulfide) (21 grams) and monochloroanisole.

It will, of course, be apparent to those skilled in the art that modifications other than those set forth in the above examples can be employed in the process of this invention without departing from the scope thereof.

What I claim as new and desire to secure by Letters Patent of the United States is:

1. A process for the chlorination of aryl ethers which comprises forming an admixture of (1) a diaryl sulfoxide, (2) an aryl ether, and (3) a member of the class consisting of phosgene and thionyl chloride, and maintining said admixture at a temperature at which said sulfoxide, aryl ether and phosgene or thionyl chloride react to effect chlorination of said aryl ether.

2. A process as claimed in claim 1 wherein the admixture is diphenylsulfoxide, phosgene and poly(2,6-dimethyl-1,4-phenylene oxide).

3. A process as claimed in claim 1 wherein the admixture is diphenylsulfoxide, phosgene and poly(2,6-diphenyl-1,4-phenylene oxide).

4. A process as claimed in claim 1 wherein the admixture is diphenylsulfoxide, phosgene and poly(2-methyl-6-phenyl-1,4-phenylene oxide).

5. A process as in claim 1 in which the aromatic sulfoxide is bis(4-chlorophenyl)sulfoxide.

References Cited

UNITED STATES PATENTS 2,777,002   1/1957   Sullivan.

OTHER REFERENCES

Barber et al., Jour. Applied Chem., vol. 3, 1953), pages 409–416.

Berliner, Jour. Amer. Chem. Soc., vol. 80, 1958), p. 856.

BERNARD HELFIN, Primary Examiner

U.S. Cl. X.R.

96—87; 106—316; 179—100.2; 252—54, 182, 364; 260—47, 609, 613, 623